(12) United States Patent
Langer et al.

(10) Patent No.: US 10,859,191 B2
(45) Date of Patent: Dec. 8, 2020

(54) COUPLING ARRANGEMENT FOR SCREW COUPLING

(71) Applicant: Alfred Kärcher GmbH & Co. KG, Winnenden (DE)

(72) Inventors: Christian Langer, Noerdlingen (DE); Benjamin Weiss, Winnenden (DE); Ralph Seitter, Backnang (DE)

(73) Assignee: Alfred Kärcher SE & Co. KG, Winnenden (DE)

( * ) Notice: Subject to any disclaimer, the term of this patent is extended or adjusted under 35 U.S.C. 154(b) by 491 days.

(21) Appl. No.: 15/383,763

(22) Filed: Dec. 19, 2016

(65) Prior Publication Data

US 2017/0097112 A1 Apr. 6, 2017

Related U.S. Application Data

(63) Continuation of application No. PCT/EP2015/063034, filed on Jun. 11, 2015.

(30) Foreign Application Priority Data

Jun. 20, 2014 (DE) .................... 10 2014 108 699

(51) Int. Cl.
*F16L 19/025* (2006.01)
*B05B 15/65* (2018.01)
*F16L 19/00* (2006.01)

(52) U.S. Cl.
CPC ............ *F16L 19/025* (2013.01); *B05B 15/65* (2018.02); *F16L 19/005* (2013.01)

(58) Field of Classification Search
CPC ........ F16L 19/005; F16L 19/025; B05B 15/65

USPC .................................... 285/354, 386
See application file for complete search history.

(56) References Cited

U.S. PATENT DOCUMENTS

| 4,438,884 | A | 3/1984 | O'Brien et al. |
| 5,058,930 | A | 10/1991 | Schlosser |
| 5,125,694 | A | 6/1992 | Gobbi |
| 5,156,421 | A | 10/1992 | Chauvel |

(Continued)

FOREIGN PATENT DOCUMENTS

| CN | 1408058 | 4/2003 |
| DE | 26 50 301 | 5/1978 |

(Continued)

*Primary Examiner* — Zachary T Dragicevich
(74) *Attorney, Agent, or Firm* — Womble Bond Dickinson (US) LLP

(57) ABSTRACT

A coupling arrangement for a screw coupling for liquid conduits of a high-pressure cleaning apparatus is provided. The coupling arrangement includes a plug part which is pluggably connectable to a complementarily configured plug part of a second coupling arrangement of the screw coupling for establishing a liquid-tight and releasable connection therewith with a sealing ring interposed therebetween, and a connecting part having a thread that is screwably connectable to a complementarily configured thread of the second coupling arrangement. The thread can be of multiple-threaded configuration and the connecting part can include a clamping element which is aligned in an in-line relationship with the thread relative to the thread longitudinal axis and is releasably clampable against a complementarily configured clamping element of the second coupling arrangement by axially inserting one into the other.

16 Claims, 3 Drawing Sheets

(56) References Cited

U.S. PATENT DOCUMENTS

| | | |
|---|---|---|
| 5,350,200 A | 9/1994 | Peterson et al. |
| 5,362,110 A | 11/1994 | Bynum |
| 5,388,866 A | 2/1995 | Schlosser |
| 5,649,563 A | 7/1997 | Shimano |
| 5,711,822 A | 1/1998 | Burgett |
| 5,716,078 A * | 2/1998 | Powers |
| 5,788,292 A | 8/1998 | Koerner et al. |
| 6,016,975 A | 1/2000 | Amaduzzi |
| 6,237,968 B1 * | 5/2001 | Bohnes ............. 285/354 X |
| 6,991,266 B2 * | 1/2006 | Nishio ............. 285/354 X |
| 7,744,018 B2 | 6/2010 | Alexander et al. |
| 2002/0008386 A1 | 1/2002 | Lee |
| 2004/0061329 A1 | 4/2004 | Guest |
| 2010/0213705 A1 * | 8/2010 | Williams ............. 285/354 X |
| 2013/0161941 A1 | 6/2013 | Zulauf et al. |

FOREIGN PATENT DOCUMENTS

| | | |
|---|---|---|
| DE | 30 18 077 | 12/1980 |
| DE | 91 02 402 | 4/1992 |
| DE | 102 17 615 | 11/2003 |
| EP | 0 383 029 | 8/1990 |
| EP | 0 444 523 | 9/1991 |
| EP | 1 043 080 | 10/2000 |
| EP | 1 571 385 | 9/2005 |
| EP | 3 056 782 | 8/2016 |
| FR | 2 660 983 | 10/1991 |
| JP | 2003 148661 | 5/2003 |
| WO | WO 00/77434 | 12/2000 |
| WO | WO 02/089997 | 11/2002 |
| WO | WO 2013/101534 | 7/2013 |
| WO | WO 2015/193164 | 12/2015 |

* cited by examiner

COUPLING ARRANGEMENT FOR SCREW COUPLING

CROSS-REFERENCE TO RELATED APPLICATIONS

This application is a continuation of international application number PCT/EP2015/063034 filed on Jun. 11, 2015, which claims priority to German application No. 10 2014 108 699.6 of Jun. 20, 2014, each of which are incorporated herein by reference in their entirety and for all purposes.

BACKGROUND OF THE INVENTION

The invention relates to a coupling arrangement for a screw coupling for liquid conduits of a high-pressure cleaning apparatus, wherein the coupling arrangement comprises a plug part capable of being pluggably connected to a complementarily configured plug part of a second coupling arrangement of the screw coupling for establishing a liquid-tight and releasable connection therewith with a sealing ring interposed therebetween, and wherein the coupling arrangement comprises a connecting part having a thread that is capable of being screwed together with a complementarily configured thread of the second coupling arrangement.

Screw couplings are used in high-pressure cleaning apparatuses in order to enable liquid conduits to be connected together in a tight and releasable manner. By use of a screw coupling, it is for example possible for a high-pressure hose to be connected with the pressure outlet of a high-pressure cleaning appliance, and it is also possible for a releasable and liquid-tight connection to be produced between the pressure hose and a liquid discharge device which may, for example, be a spray gun. Such screw couplings also allow for a releasable and liquid-tight connection to be established between a spray gun and a spray lance and between a spray lance and a spray nozzle. The connections can be released again by the user as required.

The screw couplings comprise a first coupling arrangement and a second coupling arrangement that can be screwed together. The first coupling arrangement comprises a first plug part that is capable of being pluggably connected to a second plug part of the second coupling arrangement complementary in configuration to the first plug part for establishing between them a liquid-tight and releasable connection with a sealing ring interposed therebetween. The first plug part may, for example, be configured in the form of a nipple and the second plug part may, for example, be configured in the form of a sleeve complementary in configuration to the nipple, wherein the nipple is capable of being inserted into the sleeve and is capable of being connected to the sleeve in a liquid-tight manner by use of a sealing ring. The sealing ring may be arranged in an outer annular groove of the nipple or in an inner annular groove of the sleeve. In order to ensure that the two plug parts cannot be inadvertently released from each other, the first coupling arrangement and the second coupling arrangement comprise connecting parts which cooperate together and each of which comprises a thread so that the coupling arrangements can be screwed together.

Coupling arrangements of the type mentioned at the outset are known for example from publication nos. DE 91 02 402 U1 and WO 96/08669 A1. In these coupling arrangements, the thread is arranged on a connecting part that is configured in the form of a union ring. The thread usually is of single-thread configuration and has a small lead angle, often amounting to approximately 2°. Such threads are self-locking and ensure that the first plug part cannot be inadvertently released from the second plug part even when the cleaning liquid pumped by the high-pressure cleaning apparatus is at high pressure. However, for a liquid-tight screw connection to be achieved between the coupling arrangements, it is required for the intermeshing threads to be turned several revolutions relative to each other. This makes establishing and releasing the screw connection a time-consuming operation and renders the screw connection difficult to handle.

It is an object of the present invention to improve a coupling arrangement of the type mentioned at the outset in such a manner that it can be connected to a second coupling arrangement in a liquid-tight and releasable manner in a shorter time, wherein it is ensured that the connection will not be inadvertently released.

SUMMARY OF THE INVENTION

In accordance with the invention, this object is accomplished in a coupling arrangement of the generic type by the thread being of a multiple-threaded configuration and by the connecting part comprising a clamping element aligned in an in-line relationship with the thread relative to the thread longitudinal axis, said clamping element being capable of being releasably clamped together with a complementarily configured clamping element of the second coupling arrangement by axially inserting one into the other.

The coupling arrangement constructed in accordance with the invention uses a multiple, or multiple-start, thread, i.e. a thread in which multiple starting threads are wrapped helically around the thread longitudinal axis in parallel to each other. The use of a multiple thread has the advantage that it allows the thread to have a large lead so that a large amount of axial movement can be achieved during one single revolution. A load imposed on the thread is simultaneously borne by multiple starting threads. By way of example, provision may be made for the multiple thread to advance an axial distance of at least 5 mm, in particular an axial distance of 6 mm, for a single revolution. This facilitates handling of the coupling arrangement in establishing a liquid-tight connection. For example, with such a configuration of the coupling arrangement, the user need give the thread only one turn through a 360° revolution relative to the thread of the second coupling arrangement, this one single revolution being sufficient already for the plug part to be inserted into the complementarily configured plug part of the second coupling arrangement far enough for a liquid-tight connection between the plug parts to be reliably achieved.

Although multi-start threads having a relatively large lead enable a large axial movement with one single revolution, they frequently are not self-locking because of their relatively large lead angle. Therefore, the coupling arrangement constructed in accordance with the invention uses in addition to the multiple thread a clamping element which is aligned in an in-line relationship relative to the thread longitudinal axis and can be clamped together with a complementarily configured clamping element of the second coupling arrangement by axially inserting the two clamping elements one into the other.

The clamping elements can overlap in an axial direction, wherein the clamping elements are mutually clamped, thereby preventing inadvertent separation of the coupling arrangements.

The multiple thread having a relatively large lead affords the user the possibility of making a liquid-tight connection in a very short time, wherein a large amount of axial movement is achieved in one single revolution of the thread, and the use of the clamping element enables an inadvertent release of the connection to be prevented despite the thread not necessarily being of self-locking configuration.

It is advantageous for the coupling arrangement to be capable of being connected to a complementarily configured coupling arrangement of the screw coupling without the use of tools. The user can thus establish and also release a liquid-tight connection between two liquid conduits of a high-pressure cleaning apparatus without the assistance of tools.

In an advantageous embodiment, the clamping element has an annular face oriented coaxially with the thread longitudinal axis, said annular face being capable of being clamped together with a complementarily configured annular face of the clamping element of the second coupling arrangement. The two annular faces can be inserted one into the other in an axial direction relative to the thread longitudinal axis so that one of the two annular faces surrounds the other annular face in a circumferential direction and the two annular faces are clamped together.

It is advantageous for the annular face of the coupling arrangement constructed in accordance with the invention to be of conical configuration. The annular face thus forms a frusto-conically shaped section of the connecting part that clampingly cooperates with a complementarily configured frusto-conically shaped section of the second coupling arrangement.

The cone angle of the conical annular face is preferably approximately 2° to approximately 11°, in particular 5° to 6°. Here, the term "cone angle" is used to denote the opening angle of the conical annular face, i.e. the opening angle of the frusto-conically shaped section of the connecting part. It has been shown that a relatively small cone angle facilitates the handling of the coupling arrangement in establishing a liquid-tight connection with a complementarily configured second coupling arrangement.

It is particularly advantageous for the cone angle of the conical annular face to be 0.8 times to 1.2 times the lead angle of the thread.

In particular, provision may be made for the cone angle of the conical annular face to be identical to the lead angle of the multiple thread, within the limits of the fabrication tolerances.

Preferably, the lead angle of the thread is 5° to 6°.

Provision may be made for the lead angle of the multiple thread to be 5.2° to 5.8° and for the cone angle of the conical annular face to be 5.2° to 6.1°.

The number of starting threads of the multiple thread in the coupling arrangement constructed in accordance with the invention is preferably 2 to 6. A quadruple thread is particularly advantageous.

It is advantageous for the thread to be configured in the form of a trapezoidal thread.

In a particularly preferred embodiment of the coupling arrangement constructed in accordance with the invention, a dirt-receiving space is arranged in an axial direction, between the thread and the clamping element. This has the advantage that particles of dirt that accumulate in the area of the thread when the coupling arrangement is not in use, will not simply be displaced from the thread to the area of the clamping element when the coupling arrangement is screwed together with a second, complementarily configured coupling arrangement. Instead, as the coupling arrangements are being screwed together, dirt particles that have accumulated in the area of the thread on the connecting part are transferred from the area of the thread into the dirt-receiving space adjoining the thread in an axial direction so that they do not get to the clamping element directly and cannot interfere with the clamping action.

In an advantageous embodiment of the invention, the dirt-receiving space is configured as an annular space that is oriented coaxially with the thread longitudinal axis. By way of example, the annular space may be configured in the form of an annular groove integrally formed in the connecting part, in the area between the thread and the clamping element.

Advantageously, the length of the dirt-receiving space in an axial direction is 0.7 times to 1.3 times the length of the thread. In particular, provision may be made for the dirt-receiving space to be approximately the same length as the thread.

It is preferred for the dirt-receiving space to adjoin the thread directly in an axial direction.

It is preferred for the clamping element to adjoin the dirt-receiving space directly in an axial direction.

It is advantageous for the clamping element to extend in an axial direction over a length that is practically identical to the length of the multiple thread.

Preferably, the thread and the clamping element are connected together in one piece. They together thus form a one-piece component part of the coupling arrangement.

In a preferred embodiment, the connecting part of the coupling arrangement is configured as a union ring that is supported on the plug part for free rotation and at most limited displacement in an axial direction, wherein the multiple thread is configured as an internal thread of the union ring and the clamping element is arranged on the inner side of the union ring. For establishing a liquid-tight connection, the plug part can be pluggably connected to a complementarily configured plug part of a second coupling arrangement with a sealing ring interposed therebetween, and a screw connection can be established between the coupling arrangement and the second coupling arrangement by way of the union ring.

The union ring has an internal multiple thread and is supported on the plug part for free rotation and, preferably, practically no displacement in an axial direction. The internal thread is arranged between the point of support of the union ring and the free end face of the union ring, and the clamping element is positioned on the side of the internal thread facing away from the point of support of the union ring. Advantageously, the above-described dirt-receiving space is arranged between the internal thread and the clamping element.

Advantageously, when a union ring is used, the clamping element is configured as an inner cone of the union ring whose internal diameter decreases with increasing distance from the free end face of the union ring.

It is preferred for the inner cone to extend to the free end face of the union ring. The inner cone thus adjoins the free end face of the union ring directly, and the multiple thread is positioned on the inner side of the union ring, at a location spaced from the free end face.

As an alternative to the configuration of the connecting part in the form of a union ring, provision may be made, for example, for the connecting part to be connected to the plug part in a rigid manner and, in particular, in one piece. In a one-piece embodiment, the plug part and the connecting part together can form a one-piece component part. For example, the plug part may be configured in the form of a nipple-shaped or a sleeve-shaped extension which is adjoined in one piece by the connecting part in an axial direction.

In a rigid, preferably one-piece, connection of the connecting part with the plug part, it is advantageous for the thread to be configured as an external thread and for the clamping element to be arranged on the outer side of the connecting part.

In a configuration in which the connecting part is connected with the plug part in a rigid manner and, in particular, in one piece, it is advantageous for the clamping element of the coupling arrangement to be configured as an outer cone whose external diameter increases with increasing axial distance from the thread.

It may also be provided that, in a configuration in which the connecting part is connected with the plug part in a rigid manner, the thread is configured as an internal thread and the clamping element is arranged on the inner side of the connecting part. By way of example, the plug part may be configured in the form of a sleeve and the connecting part may be configured as a connecting ring arranged upstream of the sleeve, said connecting ring being oriented concentrically with the sleeve and carrying, on the inner side thereof, the internal thread and the clamping element. When a plug connection is being established between the sleeve and a complementarily configured nipple, the nipple having an external thread can be screwed into the connecting ring.

In an advantageous embodiment, the clamping element is rigidly connected to the plug part and forms an inner cone whose internal diameter decreases with increasing distance from the free end face of the connecting part.

It is advantageous for the plug part to carry the sealing ring and to have, in an axial direction, between the sealing ring and the thread, an annular groove in which an O-ring is arranged. By way of the O-ring, it is possible to prevent particulate debris from reaching the sealing ring when the plug part is plugged together with the complementarily configured plug part of the second coupling arrangement.

As has already been mentioned, the plug part of the coupling arrangement constructed in accordance with the invention may, for example, be configured as a nipple. In such a case, a complementarily configured plug part of a second coupling arrangement may, for example, be configured as a sleeve into which the nipple is capable of being inserted with a sealing ring interposed between them. By way of example, the sealing ring may be arranged in an annular groove that surrounds the nipple in a circumferential direction or in an annular groove incorporated in the wall of an internal bore of the sleeve.

When the plug part is configured in the form of a nipple, it is advantageous for the nipple to comprise a first longitudinal section which has the sealing ring arranged therein and which extends from the free end face of the nipple to an enlargement of the nipple which is adjoined by a second longitudinal section of the nipple whose diameter is larger than the diameter of the first longitudinal section. In such a configuration, the nipple is of stepped configuration, wherein the nipple is capable of having the first longitudinal section thereof come into sealing contact against a sealing face of a sleeve of the second coupling arrangement, with the sealing ring interposed therebetween. The second longitudinal section of the nipple can come into contact against a guide face of the sleeve located upstream of the sealing face in a direction of mating, said guide face facilitating insertion of the nipple into the sleeve. When the liquid-tight connection between the sleeve and the nipple is released, then the first longitudinal section of the nipple together with the sealing ring held thereon can reach the area of the guide face before the screw connection between the two coupling arrangements is fully released. When the sealing ring assumes a position in the area of the guide face of the sleeve, the sealing effect is no longer guaranteed and liquid can escape to the outside via the area between the first longitudinal section of the nipple and the guide face of the sleeve. The leakage of liquid can be recognized by the user even before he or she has fully released the screw connection and, by screwing the two coupling arrangements together again, the user can re-insert the nipple into the sleeve far enough for the sealing ring to re-establish liquid-tight contact against the associated sealing face of the sleeve, thus re-establishing the fluid-tight connection. It is thus possible to prevent inadvertent separation of the two coupling arrangements in a condition in which pressurized liquid is still flowing through the coupling arrangements.

The plug part of the coupling arrangement constructed in accordance with the invention may, for example, also be configured in the form of a sleeve that has an internal bore. In such a configuration, a complementarily configured plug part of a second coupling arrangement may, for example, be configured in the form of a nipple that is capable of being inserted into the internal bore of the sleeve.

The sleeve may, on the inner side thereof, have an annular groove incorporated in the wall of the internal bore, said annular groove having the sealing ring positioned therein. Alternatively, provision may be made for the nipple that is capable of being inserted into the internal bore of the sleeve to carry on its outer side an annular groove in which the sealing ring is arranged.

As has already been mentioned, the connecting part of the coupling arrangement constructed in accordance with the invention may be configured as a union ring. With the plug part being configured in the form of sleeve, the union ring can surround the sleeve in a circumferential direction and can be supported on the sleeve in rotationally fixed relation and for at most limited displacement in an axial direction. In an advantageous configuration, a retaining ring is used for supporting the union ring on the sleeve.

In an advantageous embodiment, the connecting part is connected to the sleeve in a rigid manner and, in particular, in one piece.

The connecting part may surround the sleeve in a circumferential direction.

The sleeve and the connecting part together may form a one-piece component part, wherein the sleeve forms the inner side of the component part and the connecting part forms the outer side of the component part. On its outer side, the component part may comprise an external thread and a clamping element of preferably cone-shaped configuration. On its inner side, the component part may form a sealing face against which a sealing ring is capable of being brought into sealing contact.

Alternatively, provision may be made for the connecting part to be connected to the sleeve in a rigid manner and, in particular, in one piece and to be oriented coaxially with the sleeve.

The connecting part may form a connecting ring having an internal thread into which a complementarily configured nipple having an external thread can be screwed. The connecting ring and the sleeve together may form a one-piece component part.

The clamping element of preferably cone-shaped configuration may be arranged on the inner side of the connecting ring.

It is advantageous for the internal bore of the sleeve to form a sealing face against which a sealing ring is capable of being brought into sealing contact and which is adjoined in an axial direction by a guide face whose internal diameter is larger than the internal diameter of the sealing face. The guide face can extend to a free end face of the sleeve, advantageously wherein it widens continuously in an end region immediately adjacent to said end face. This facilitates insertion of a nipple into the sleeve.

The invention further relates to a screw coupling for liquid conduits of a high-pressure cleaning apparatus, wherein by way of the screw coupling, a liquid-tight connection between two liquid conduits of the high-pressure cleaning apparatus is capable of being achieved in a short time, while ensuring that the connection is not inadvertently released. To this end, the screw coupling constructed in accordance with the invention comprises a first coupling arrangement of the kind constructed in accordance with the invention in which the plug part is configured in the form of a nipple and a second coupling arrangement of the kind constructed in accordance with the invention in which the plug part is configured as a sleeve, wherein the nipple of the first coupling arrangement is capable of being inserted into the sleeve of the second coupling arrangement with a sealing ring interposed therebetween, wherein the multiple thread of the second coupling arrangement is of complementary configuration to the multiple thread of the first coupling arrangement and the clamping element of the second coupling arrangement is complementary in configuration to the clamping element of the first coupling arrangement and wherein the two clamping elements are capable of being releasably clamped together by axially inserting one into the other. The two coupling arrangements are capable of being screwed together by way of the threads, wherein the threads have a complementary configuration relative to one another and are in each case of multiple-thread, preferably quadruple-thread, configuration. It is preferred for the nipple of the first coupling arrangement to be, during one single revolution of the two threads relative to each other, capable of being inserted into the complementarily configured sleeve of the second coupling arrangement in an axial direction sufficiently far for the nipple and the sleeve, together with the sealing ring arranged between the nipple and sleeve, to ensure a liquid-tight connection. When the two threads reach their final position, the clamping elements of the two coupling arrangements inserted one into the other in an axial direction clamp against each other. The clamping elements thus define the final position of the two threads when screwing the coupling arrangements together and ensure that the coupling arrangements cannot inadvertently be released from one another even when the cooperating threads are not self-locking.

It is advantageous for the two coupling arrangements of the screw coupling constructed in accordance with the invention to be capable of being screwed together without tools. This facilitates handling of the screw coupling.

In the screw coupling constructed in accordance with the invention, the two coupling arrangements comprise plug parts having a complementary configuration relative to each other, said plug parts being capable of being plugged one into the other with a sealing ring interposed therebetween, and the coupling arrangements additionally comprise connecting parts which each comprise a multiple thread and a clamping element. The clamping elements and the threads have a complementary configuration relative to each other.

Provision may be made for the multiple thread and the clamping element of the second coupling arrangement to be arranged on the outer side of the sleeve or in axially offset relation to the sleeve.

It is advantageous for the sleeve to form on its inner side a sealing face against which a sealing ring held on the nipple of the first coupling arrangement is capable of being brought into sealing contact.

It is advantageous for the clamping element of the second coupling arrangement to be configured as an annular face oriented coaxially with the thread longitudinal axis and, in particular, as a conical annular face. The annular face may form an outer cone that is arranged on the outer side of the sleeve.

As has already been mentioned, provision may also be made for the second coupling arrangement whose plug part is configured as a sleeve to comprise a union ring that is supported on the sleeve for free rotation and at most limited displacement, preferably substantially no displacement, in an axial direction, wherein the thread of the second coupling arrangement is configured as an internal thread of the union ring and the clamping element of the second coupling arrangement is positioned on the inner side of the union ring.

The clamping element may, for example, be configured in the form of an inner cone of the union ring.

Advantageously, a dirt-receiving space is positioned between the multiple-start threads and the clamping elements of the coupling arrangements in each case, as has been discussed in detail hereinabove.

The screw coupling constructed in accordance with the invention is preferably used for establishing a fluid-tight connection, capable of being released without tools, between the pressure outlet of a high-pressure cleaning apparatus and a pressure hose and/or between a pressure hose and a spray gun and/or between a spray gun and a spray lance and/or between a spray lance and a spray nozzle.

The following description of preferred embodiments of the invention, taken in conjunction with the drawings, serves to explain the invention in greater detail.

DETAILED DESCRIPTION OF THE INVENTION

Figure 1:
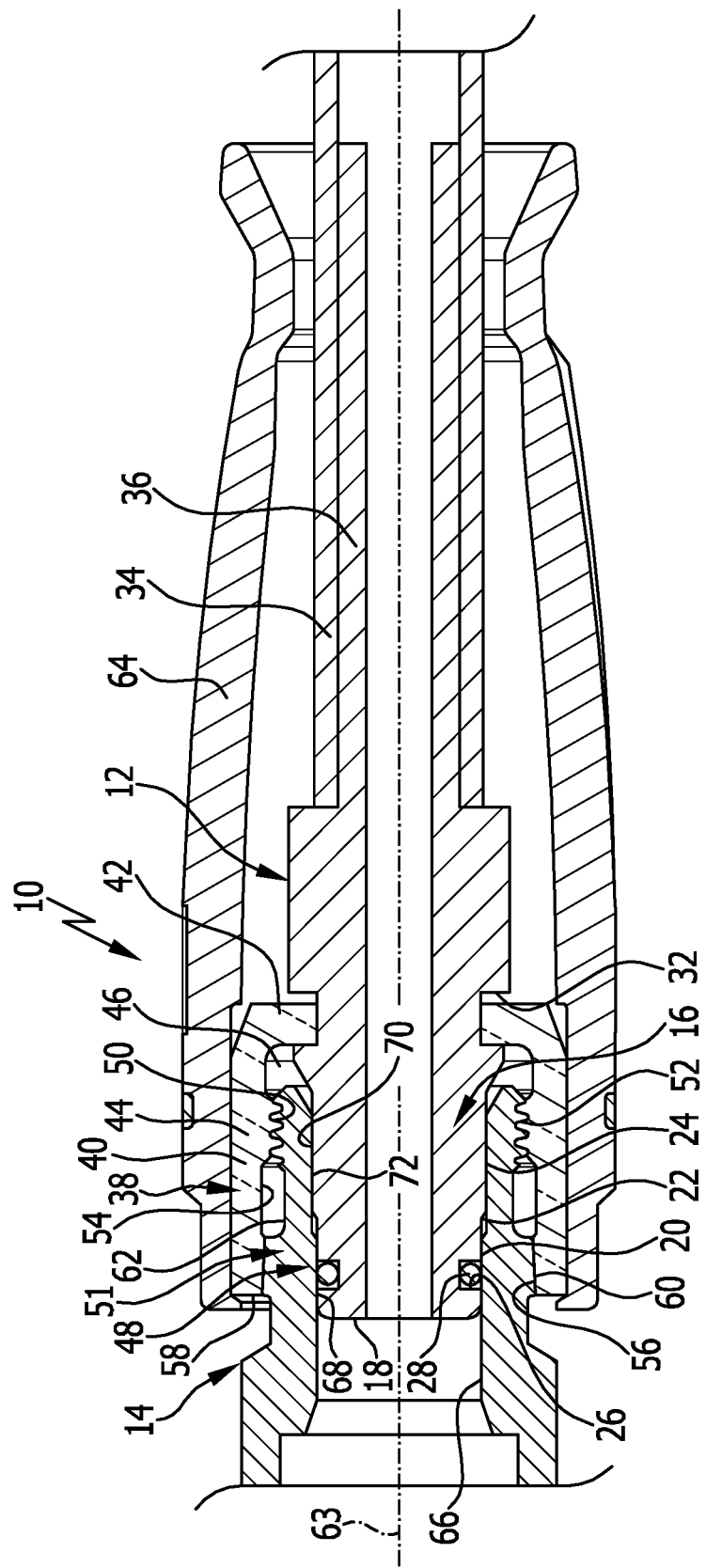
FIG. 1 shows a schematic longitudinal sectional view of a first advantageous embodiment of a screw coupling having two coupling arrangements constructed in accordance with the invention.

FIG. 1 is a schematic representation of a first advantageous embodiment of a screw coupling, generally designated by the reference numeral 10. The screw coupling 10 comprises a first coupling arrangement 12 and a second coupling arrangement 14 of complementary configuration, these being configured in accordance with the invention and easy to be screwed together in a liquid-tight manner without the use of tools and capable of being separated again from each other without tools as required.

The first coupling arrangement 12 comprises a plug part in the form of a nipple 16 having a free end face 18 which is adjoined by a first longitudinal section 20 that transitions via an enlargement 22 into a second longitudinal section 24.

The diameter of the second longitudinal section 24 is larger than the diameter of the first longitudinal section 20. In the region of the first longitudinal section 20, the nipple 16 is formed with an annular groove 26 which has a sealing ring 28 arranged therein.

At a location spaced from the second longitudinal section 24, the nipple 16 has a circumferential groove 32. In the embodiment as illustrated, the nipple 16 is connected to a pressure hose 34. To this end the nipple 16 forms, in its end region facing away from the sealing ring 28, a hollow connecting piece 36 onto which the pressure hose 34 is pressed.

Extending into the circumferential groove 32 is a connecting part 38 of the first coupling arrangement 12. In the exemplary embodiment shown, the connecting part 38 is configured as a union ring 40 which is supported in the circumferential groove 32 for free rotation and practically no displacement in an axial direction and which extends beyond the sealing ring 28 in an axial direction. The union ring 40 extends into the circumferential groove 32 by way of a rear wall 42 thereof. The rear wall 42 is connected in one piece to a circumferential wall 44 of the union ring 40. The circumferential wall 44 and the nipple 16 define between them an annular intermediate space 46 into which the second coupling arrangement 14 extends by way of a plug part configured as a sleeve 48.

The union ring 40 has, on the inner side thereof, an internal multiple thread 50 that can be screwed onto an external multiple thread 52 of complementary configuration. The external thread 52 as well as an outer cone 60 that will be described in more detail below is formed by a connecting part 51 of the second coupling arrangement 14 which surrounds the sleeve in a circumferential direction and is connected to the sleeve 48 rigidly and in one piece. Adjoining the internal thread 50 in an axial direction is an annular dirt-receiving space 54 of the union ring 40 which is adjoined by an annular clamping element in the form of an inner cone 56. The diameter of the inner cone 56 increases with increasing distance from the internal thread 50. The inner cone extends to a free end face 58 of the union ring 40 facing away from the rear wall 42.

The connecting part 51 surrounding the sleeve 48 forms with the outer cone 60 that is arranged at a level of the inner cone 56 of the union ring 40 an annular clamping element of a configuration complementary to the inner cone 56. At a location between the outer cone 60 and the external thread 52, the connecting part 51 has a dirt-receiving space 62 that is surrounded by the dirt-receiving space 54 of the union ring 40.

A longitudinal axis 63 of the screw coupling 10 forms a thread longitudinal axis of both the internal thread 50 and the external thread 52. The inner cone 56 is aligned in an in-line relationship with the internal thread 50 relative to the thread longitudinal axis, and the outer cone 60 is aligned in an in-line relationship with the external thread 52 relative to the thread longitudinal axis.

The sleeve 48 can be arranged for example at the pressure outlet of a high-pressure cleaning apparatus or also at the inlet or outlet of a spray gun or, for example, at the inlet of a spray nozzle by which a pressurized cleaning liquid can be directed onto an object to be cleaned. As has been explained above, the nipple 16 can be arranged on a pressure hose 34 or also, for example, on a spray lance.

In the exemplary embodiment illustrated in FIG. 1, the union ring 40 is surrounded by a grip sleeve 64 that is press-fit onto the union ring 40 and connected in rotationally fixed relationship therewith.

The sleeve 48 comprises a cylindrical internal bore 66 having a sealing face 68 against which the sealing ring 28 is capable of being brought into sealing contact, and having a guide face 72 which adjoins the sealing face 68 in a direction towards the free end 70 of the sleeve 48 and whose internal diameter is larger than the internal diameter of the sealing face 68.

For establishing a liquid-tight and releasable connection between the first coupling arrangement 12 and the second coupling arrangement 14, the nipple 16 can be inserted into the sleeve 48, wherein first the first longitudinal section 20 of the nipple 16 enters the guide face 72 of the sleeve 48 and then the sleeve enters the annular intermediate space 46 between the circumferential wall 44 of the union ring 40 and the nipple 16. The union ring 40 can be passed over the sleeve 48 in an axial direction sufficiently far for the external thread 52 of the sleeve 48 to come into engagement with the internal thread 50 of the union ring 40. To this end, the smallest diameter of the inner cone 56 is selected to be larger than the external diameter of the external thread 52 so that the inner cone 56 can be pushed over the external thread 52. The internal thread 50 can then be screwed together with the external thread 52. The two threads each have a quadruple-thread configuration with a lead of 6 mm so that an axial travel of 6 mm can be realized in a single revolution. In this operation, the inner cone 56 slides along the outer cone 60 and is, in a final position in which the internal thread 50, after one revolution thereof, is fully screwed onto the external thread 52 and in which the sealing ring 28 is in liquid-tight contact against the sealing face 68, clamped together with the outer cone 60. This ensures that the screwed connection between the first coupling arrangement 12 and the second coupling arrangement 14 cannot be inadvertently released. During the screwing action, particles of dirt which are present in the area of the external thread 52 before the internal thread 50 is screwed onto the external thread 52 are transferred into the dirt-receiving spaces 54 and 62 without contaminating the inner cone 56 or the outer cone 60.

When the screw connection between the first coupling arrangement 12 and the second coupling arrangement 14 is released again, the sealing ring 28 reaches the area of the guide face 72 before the internal thread 50 is fully separated from the external thread 52. If the screw coupling 10 still has flow of pressurized liquid therethrough when the connection between the first coupling arrangement 12 and the second coupling arrangement 14 is being released, the connection will become leaky once the sealing ring 28 reaches the guide face 72, and pressurized liquid can leak across the guide face 72 to the exterior without the screw connection being already fully disconnected. The emanating liquid can serve as a signal to indicate to the user that the screw coupling 10 still has flow of liquid therethrough. The user can then fully and promptly re-establish the screw connection by fully re-screwing the internal thread 50 onto the external thread 52.

The provision of the multi-start threads 50 and 52 makes it very easy for the user to establish and release the liquid-tight screw connection between the first coupling arrangement 12 and the second coupling arrangement 14, and the provision of the inner and outer cones 56, 60 which are capable of being axially inserted one into the other and clamped together can reliably counteract inadvertent release of the screw connection without the threads 50 and 52 having to be of a self-locking configuration.

Figure 2:
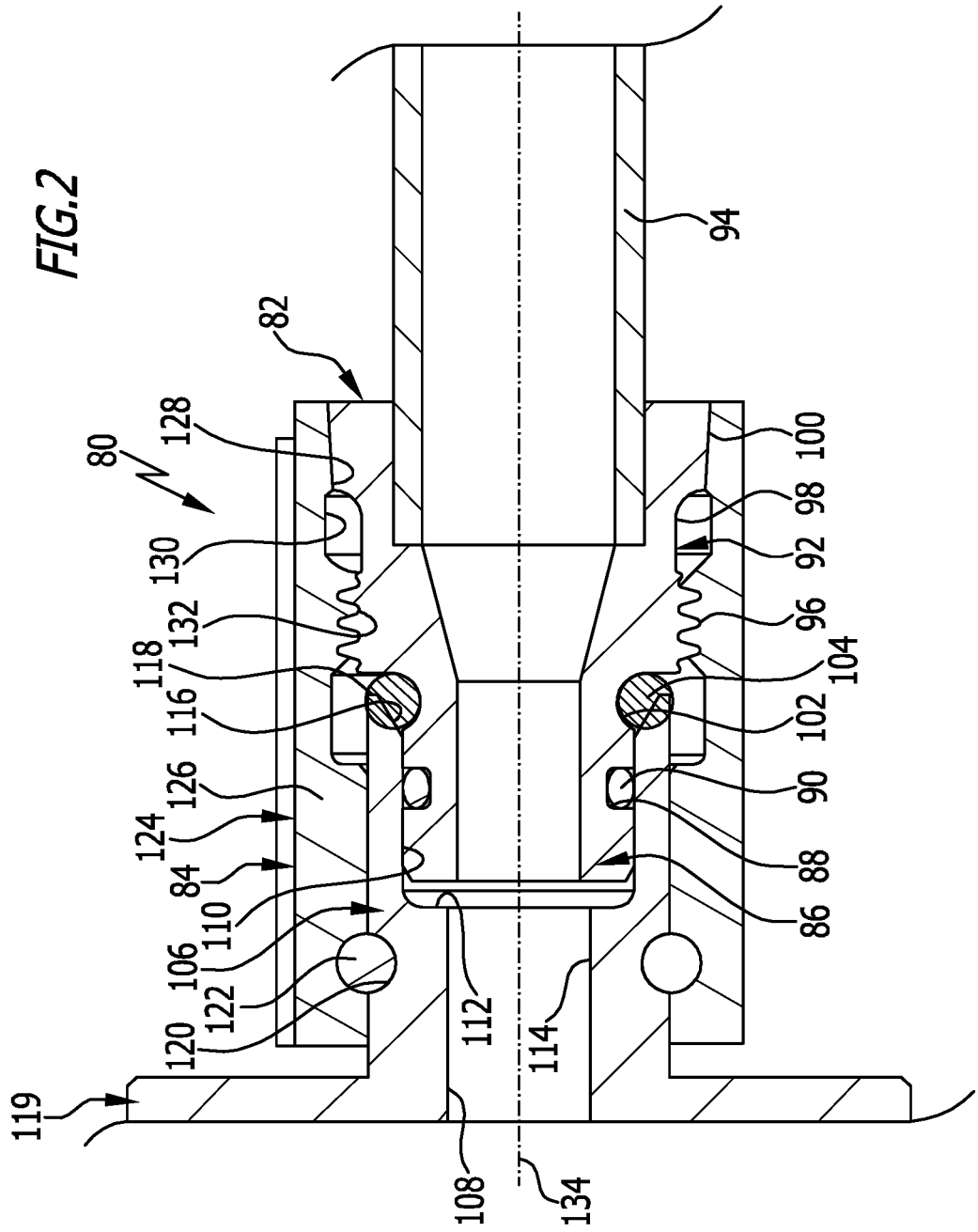
FIG. 2 shows a schematic longitudinal sectional view of a second advantageous embodiment of a screw coupling having two coupling arrangements constructed in accordance with the invention.

FIG. 2 is a schematic representation of a second advantageous embodiment of a screw coupling constructed in accordance with the invention, generally designed by the reference numeral 80. The screw coupling 80 comprises a first coupling arrangement 82 and a second coupling arrangement 84, these being configured in accordance with the invention and capable of being screwed together in a liquid-tight manner without the use of tools and of being separated again from each other without tools as required.

The first coupling arrangement 82 comprises a plug part in the form of a nipple 86 having an annular groove 88 which has a sealing ring 90 arranged therein. Differently from the first coupling arrangement 12 described above with reference to FIG. 1, the first coupling arrangement 82 comprises a connecting part 92 that is connected in one piece to the nipple 86. In the exemplary embodiment as illustrated, the connecting part 92 is press-fit onto a jet tube 94 of a high-pressure cleaning apparatus. The connecting part 92 carries, on the outer side thereof, an external multiple thread 96 which is, in an axial direction and facing away from the nipple 86, adjoined by a dirt-receiving space 98 which in turn is adjoined by a clamping element of the first coupling arrangement 82 in the form of an outer cone 100.

In the transition area between the nipple 86 and the external thread 96, the first coupling arrangement 82 comprises a further annular groove 102 in which an O-ring 104 is arranged.

The second coupling arrangement 84 comprises a plug part in the form of a sleeve 106 having a stepped internal bore 108. The internal bore 108 comprises a cylindrical sealing face 110 which is adjoined by an outlet section 114 via a radially inwardly directed step 112 and which extends via a conical inlet section 116 to a free end 118 of the sleeve 106. In the exemplary embodiment as illustrated, the sleeve 106 is connected in one piece with a housing 119, only partially shown in the drawing, of a spray nozzle known per se and therefore not shown in the drawing in the interest of clarity.

At a level with the outlet section 114, the sleeve 106 comprises, on the outer side thereof, an annular groove 120 in which a retaining ring 122 is held. The retaining ring 122 allows a connecting part 124 of the second coupling arrangement 84 to be supported on the sleeve 106 for free rotation and non-displacement in an axial direction. In the exemplary embodiment as illustrated, the connecting part 124 is configured in the form of a union ring 126 which surrounds the sleeve 106 in a circumferential direction and extends in an axial direction beyond the free end 118 of the sleeve 106 to the outer cone 100 of the first coupling arrangement 82. At a level of the outer cone 100, the union ring 126 carries, on the inner side thereof, an inner cone 128 of complementary configuration to the outer cone 100, said inner cone 128 being adjoined by a dirt-receiving space 130 of the union ring 126. The dirt-receiving space 130 is adjoined by an internal multiple thread 132 of the union ring 126 having a configuration complementary to that of the external thread 96 of the first coupling arrangement 82.

A longitudinal axis 134 of the screw coupling 80 forms a thread longitudinal axis of both the external thread 96 and the internal thread 132. The outer cone 100 is aligned in an in-line relation with the external thread 96 relative to the thread longitudinal axis, and the inner cone 128 is aligned in an in-line relationship with the internal thread 132 relative to the thread longitudinal axis.

For establishing a liquid-tight connection between the first coupling arrangement 82 and the second coupling arrangement 84, the nipple 86 can be inserted into the sleeve 106 before the external thread 96 comes into engagement with the internal thread 132. Thereafter, the internal thread 132 can be screwed together with the external thread 96, wherein an axial travel of approximately 6 mm is obtained in a single revolution, whereby the sealing ring 90 comes into sealing contact against the sealing face 110 and the inner cone 128 is clamped with the outer cone 110. During the screwing action, dirt particles present in the area of the external thread prior to the screwing-on operation are transferred into the dirt-receiving spaces 98 and 130 during the screwing action and are thus prevented from contaminating the inner cone 128 and the outer cone 110.

Figure 3:
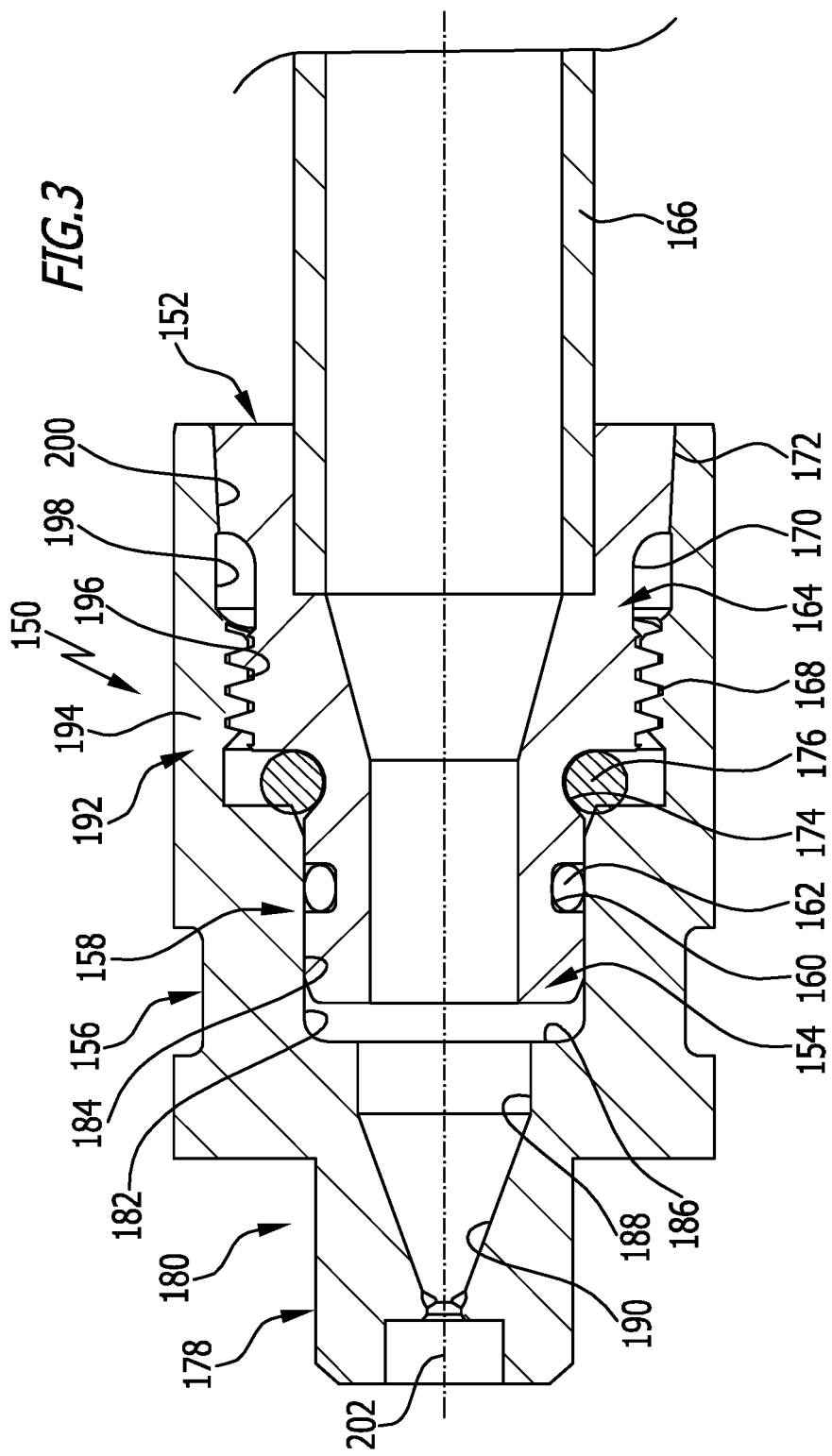
FIG. 3 shows a schematic longitudinal sectional view of a third advantageous embodiment of a screw coupling having two coupling arrangements constructed in accordance with the invention.

FIG. 3 is a schematic representation of a third advantageous embodiment of a screw coupling constructed in accordance with the invention, generally designed by the reference numeral 150. The screw coupling 150 comprises a first coupling arrangement 152 comprising a plug part in the form of a nipple 154 and a second coupling arrangement 156 comprising a plug part in the form of a sleeve 158. The first coupling arrangement 152 and the second coupling arrangement 156 are each configured in accordance with the invention and are capable of being screwed together in a liquid-tight manner without the use of tools and of being separated again from each other without tools as required.

The nipple 154 has, on the outer side thereof, an annular groove 160 in which a sealing ring 162 is arranged, and, in accordance with the first coupling arrangement 82 described above with reference to FIG. 2, the first coupling arrangement 152 likewise comprises a connecting part 164 that is connected with the nipple 154 in a rigid manner and, in the exemplary embodiment illustrated, in one piece, said connecting part 164 in the exemplary embodiment illustrated being press-fit onto a jet tube 166. The connecting part 164 carries, on the outer side thereof, an external multiple thread 168 which is, in an axial direction and facing away from the nipple 154, adjoined by a dirt-receiving space 170 which in turn is adjoined by a clamping element of the first coupling arrangement 152 in the form of an outer cone 172. In the transition area between the nipple 154 and the external thread 168, the first coupling arrangement 152 comprises a further annular groove 174 in which an O-ring 176 is arranged.

The second coupling arrangement 156 comprises the above-mentioned sleeve 158 which in the exemplary embodiment illustrated is connected rigidly and in one piece to a housing 178 of a spray nozzle 180. Via the spray nozzle 180, cleaning liquid that has been pressurized by a high-pressure cleaning apparatus can be directed towards an object that is to be cleaned.

The sleeve 158 comprises a stepped internal bore 182 comprising a cylindrical sealing face 184 which is, via a radially inwardly directed step 186, adjoined by an outlet section 188 via which the pressurized cleaning liquid can be supplied to a conical nozzle orifice 190.

The sleeve 158 is adjoined, on the side thereof facing away from the nozzle housing 178, by a connecting part 192 in the form of a connecting ring 194 configured coaxially with the sleeve 158. The connecting ring 194 and the sleeve 158 are connected with each other rigidly and, in the exemplary embodiment illustrated, in one piece. Thus, the connecting ring 194 in combination with the sleeve 158 and the nozzle housing 178 forms a one-piece component part.

At a level of the external thread 168 of the nipple 154, the connecting ring 194 comprises an internal multiple thread 196 which is adjoined, on the side facing away from the sleeve 158, by a dirt-receiving space 198 that surrounds the dirt-receiving space 170 of the first coupling arrangement 152 in a circumferential direction. Adjoining the dirt-receiving space 198 in an axial direction is a clamping element in the form of an inner cone 200 which is configured in a manner complementary to the outer cone 172 of the first coupling arrangement 152.

A longitudinal axis 202 of the screw coupling 150 forms a thread longitudinal axis of both the external thread 168 and the internal thread 196. The outer cone 172 is aligned in an in-line relation with the external thread 168 relative to the thread longitudinal axis, and the inner cone 200 is aligned in an in-line relationship with the internal thread 196 relative to the thread longitudinal axis.

For establishing a liquid-tight connection between the first coupling arrangement 152 and the second coupling arrangement 156, the nipple 154 can be passed through the connecting ring 194 and inserted into the internal bore 182 of the sleeve 158 even before the external thread 168 comes into engagement with the internal thread 196. The external thread 168 can then be screwed together with the internal thread 196. The external thread 168 and the internal thread 196 are each formed with a multiple, preferably quadruple thread and preferably have a lead greater than 5 mm, in particular a lead of approximately 6 mm, so that an axial travel of approximately 6 mm is achieved for a single revolution of the internal thread 196 relative to the external thread 168 and the sealing ring 162 comes into sealing contact against the sealing face 184 and the inner cone 200 is clamped with the outer cone 172. During the screwing action, dirt particles present in the area of the external thread 168 before the second coupling arrangement 156 is screwed onto the first coupling arrangement 152 are transferred into the dirt-receiving spaces 170, 198 during the screwing action and thus cannot contaminate the inner cone 200 and the outer cone 172. By the clamping action provided by the inner cone 200 and outer cone 172, it is ensured that the two coupling arrangements 152, 156 cannot be inadvertently released from each other.

The lead angle of the internal and external threads 50, 52, 132, 96, 196, 168 is 5° to 6°, preferably 5.2° to 5.8°, and the cone angle of the inner and outer cones 56, 60, 128, 100, 200, 172 is 0.8 to 1.2 times the lead angle of the internal and external threads 50, 52, 132, 96, 196, 168.

The internal and external threads 50, 52, 132, 96, 196, 168 and the dirt-receiving spaces 54, 62, 98, 130, 170, 198 are substantially the same length as the inner and outer cones 56, 60, 128, 100, 200, 172.

The invention claimed is:

1. A coupling arrangement for a screw coupling for liquid conduits of a high-pressure cleaning apparatus, wherein the coupling arrangement comprises:
    a plug part pluggably connectable to a complementarily configured plug part of a second coupling arrangement of the screw coupling for establishing a liquid-tight and releasable connection therewith with a sealing ring interposed therebetween, and
    a connecting part having a thread that is screwably connectable to a complementarily configured thread of the second coupling arrangement,
    wherein the thread of the connecting part is of a multiple-threaded configuration,
    wherein the connecting part comprises a clamping element aligned in an in-line relationship with the thread of the connecting part relative to a longitudinal axis of the thread of the connecting part and releasably clampable against a complementarily configured clamping element of the second coupling arrangement by axially inserting one into the other,
    wherein the clamping element has an annular face oriented coaxially with the longitudinal axis of the thread of the connecting part, said annular face being clampable against a complementarily configured annular face of the clamping element of the second coupling arrangement,
    wherein the annular face of the clamping element is of conical configuration,
    wherein the plug part of the coupling arrangement is configured as a nipple,
    wherein the sealing ring is arranged in an annular groove that surrounds the nipple in a circumferential direction, and
    wherein the nipple is formed with said annular groove, which groove has the sealing ring arranged therein.

2. The coupling arrangement in accordance with claim 1, wherein the thread of the connecting part is of quadruple-thread configuration.

3. The coupling arrangement in accordance with claim 1, wherein a dirt-receiving space is arranged in an axial direction, between the thread of the connecting part and the clamping element.

4. The coupling arrangement in accordance with claim 3, wherein the dirt-receiving space is configured as an annular space that is oriented coaxially with the longitudinal axis of the thread of the connecting part.

5. The coupling arrangement in accordance with claim 3, wherein the length of the dirt-receiving space in an axial direction is 0.7 times to 1.3 times the length of the thread of the connecting part.

6. The coupling arrangement in accordance with claim 1, wherein the thread of the connecting part and the clamping element are connected together in one piece.

7. The coupling arrangement in accordance with claim 1, wherein the connecting part is configured as a union ring that is supported on the plug part of the coupling arrangement for free rotation and limited displacement in an axial direction, wherein the thread of the connecting part is configured as an internal thread of the union ring and the clamping element is arranged on the inner side of the union ring.

8. The coupling arrangement in accordance with claim 7, wherein the clamping element is configured as an inner cone of the union ring whose internal diameter decreases with increasing distance from the free end face of the union ring.

9. The coupling arrangement in accordance with claim 8, wherein the inner cone extends to the free end face of the union ring.

10. The coupling arrangement in accordance with claim 1, wherein the connecting part is connected to the plug part of the coupling arrangement in a rigid manner.

11. The coupling arrangement in accordance with claim 10, wherein the thread is configured as an external thread and the clamping element is arranged on the outer side of the connecting part.

12. The coupling arrangement in accordance with claim 11, wherein the clamping element is configured as an outer cone whose external diameter increases with increasing distance from the thread.

13. The coupling arrangement in accordance with claim 10, wherein the thread of the connecting part is configured as an internal thread and the clamping element is arranged on the inner side of the connecting part.

14. The coupling arrangement in accordance with claim 13, wherein the clamping element is configured as an inner cone whose internal diameter decreases with increasing distance from the free end face of the connecting part.

15. The coupling arrangement in accordance with claim 1, wherein the plug part has, in an axial direction, between the sealing ring and the thread, an annular groove in which an O-ring is arranged.

16. The coupling arrangement in accordance with claim 1, wherein the nipple comprises a first longitudinal section which has the sealing ring arranged therein and which extends from the free end face of the nipple to an enlargement of the nipple which is adjoined by a second longitudinal section of the nipple whose diameter is larger than the diameter of the first longitudinal section.

* * * * *